United States Patent [19]

Ohnishi et al.

[11] Patent Number: 5,291,590
[45] Date of Patent: Mar. 1, 1994

[54] METHOD OF DETECTING AND PROCESSING ABNORMAL MESSAGE OUTPUT FROM COMPUTER SYSTEM AND DETECTING AND PROCESSING APPARATUS THEREFOR

[75] Inventors: Shingo Ohnishi, Nagoya; Shingo Moritomo; Tomiko Moritomo, both of Kasugai; Yoshiko Ogawa, Yokohama, all of Japan

[73] Assignee: Fujitsu Limited, Kanagawa, Japan

[21] Appl. No.: 727,739

[22] Filed: Jul. 10, 1991

[30] Foreign Application Priority Data

Jul. 13, 1990 [JP] Japan .................. 2-186251

[51] Int. Cl.⁵ ............................................ G06F 11/00
[52] U.S. Cl. ........................ 395/575; 371/29.1; 371/16.5
[58] Field of Search .............. 371/16.5, 29.1, 25.1; 395/575

[56] References Cited

U.S. PATENT DOCUMENTS

| | | | |
|---|---|---|---|
| 3,939,453 | 2/1976 | Schroeder | 340/172 |
| 4,434,489 | 2/1984 | Blyth | 371/29 |
| 4,481,582 | 11/1984 | Edsbacker | 364/200 |
| 4,592,053 | 5/1986 | Matsuura | 371/29 |
| 4,872,167 | 10/1989 | Maezawa et al. | 371/19 |

FOREIGN PATENT DOCUMENTS 0132069 1/1985 European Pat. Off. .
0336585 10/1989 European Pat. Off. .
0416171 3/1991 European Pat. Off. .

OTHER PUBLICATIONS

Research Disclosure, No. 306, Oct., 1989, "Visible Sign of Error Notice with Graphics and/or Color", p. 728.

*Primary Examiner*—Robert W. Beausoliel, Jr.
*Assistant Examiner*—Norman Wright
*Attorney, Agent, or Firm*—Nikaido, Marmelstein, Murray & Oram

[57] ABSTRACT

An abnormal message detecting and processing apparatus comprises an example message storing part (30) for storing examples of normal messages, a variable field information storing part (32) for storing information of a location of variable fields in the example messages, and an abnormal message detecting part (34). The abnormal message detecting part (34) compares input messages (36) with the example messages, except for variable fields specified by the information stored in the variable field information storing part (32), determines that an input message is abnormal if none of the example messages coincide with the input message in the comparison, and outputs the message so that the abnormal message is easily distinguishable from normal messages.

10 Claims, 7 Drawing Sheets

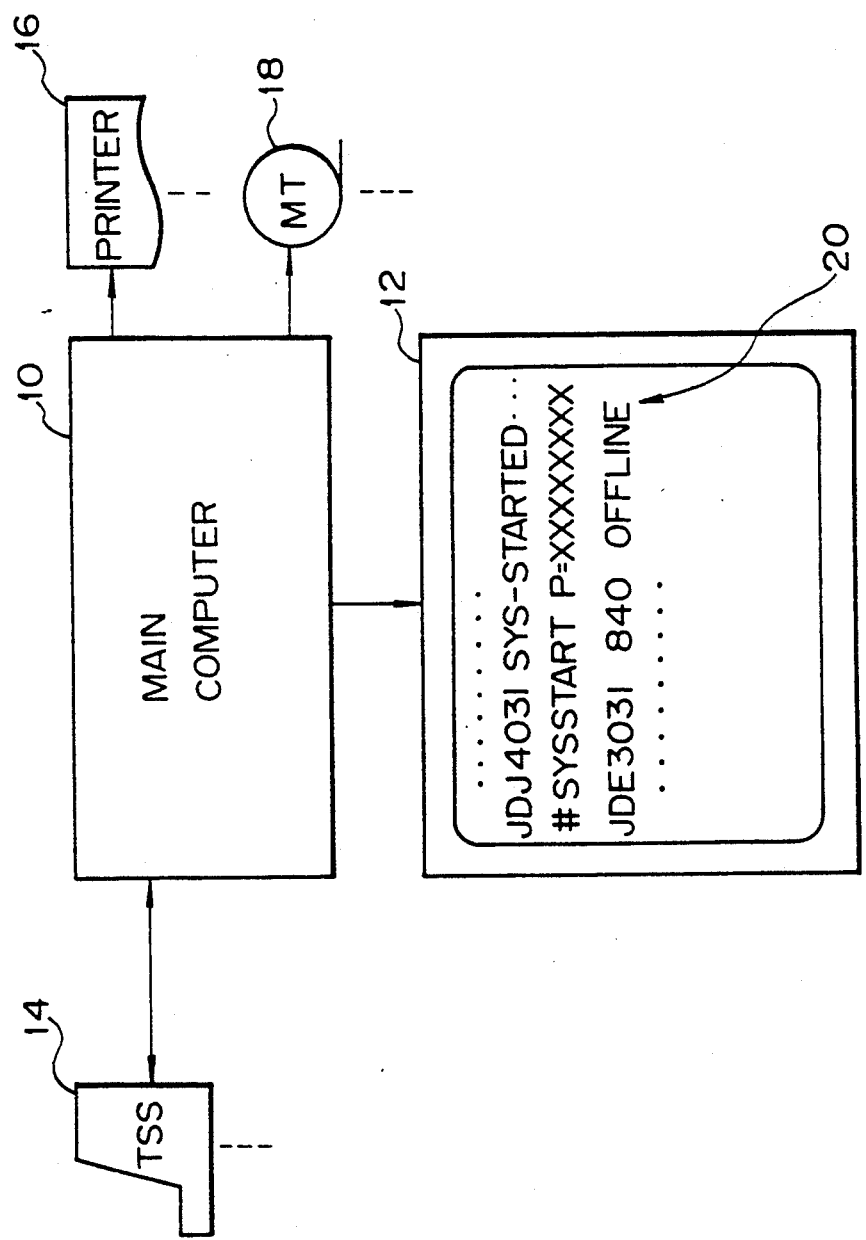

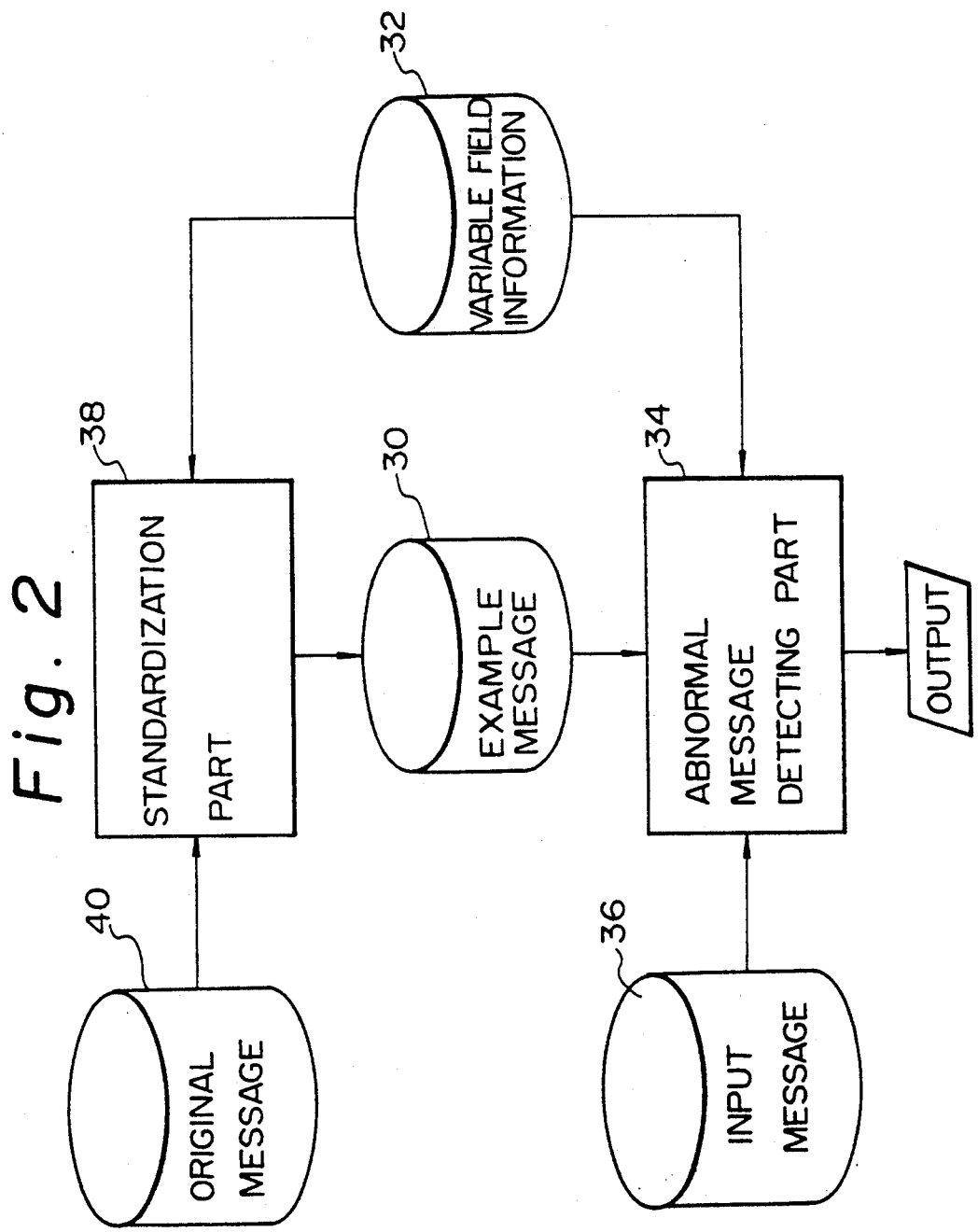

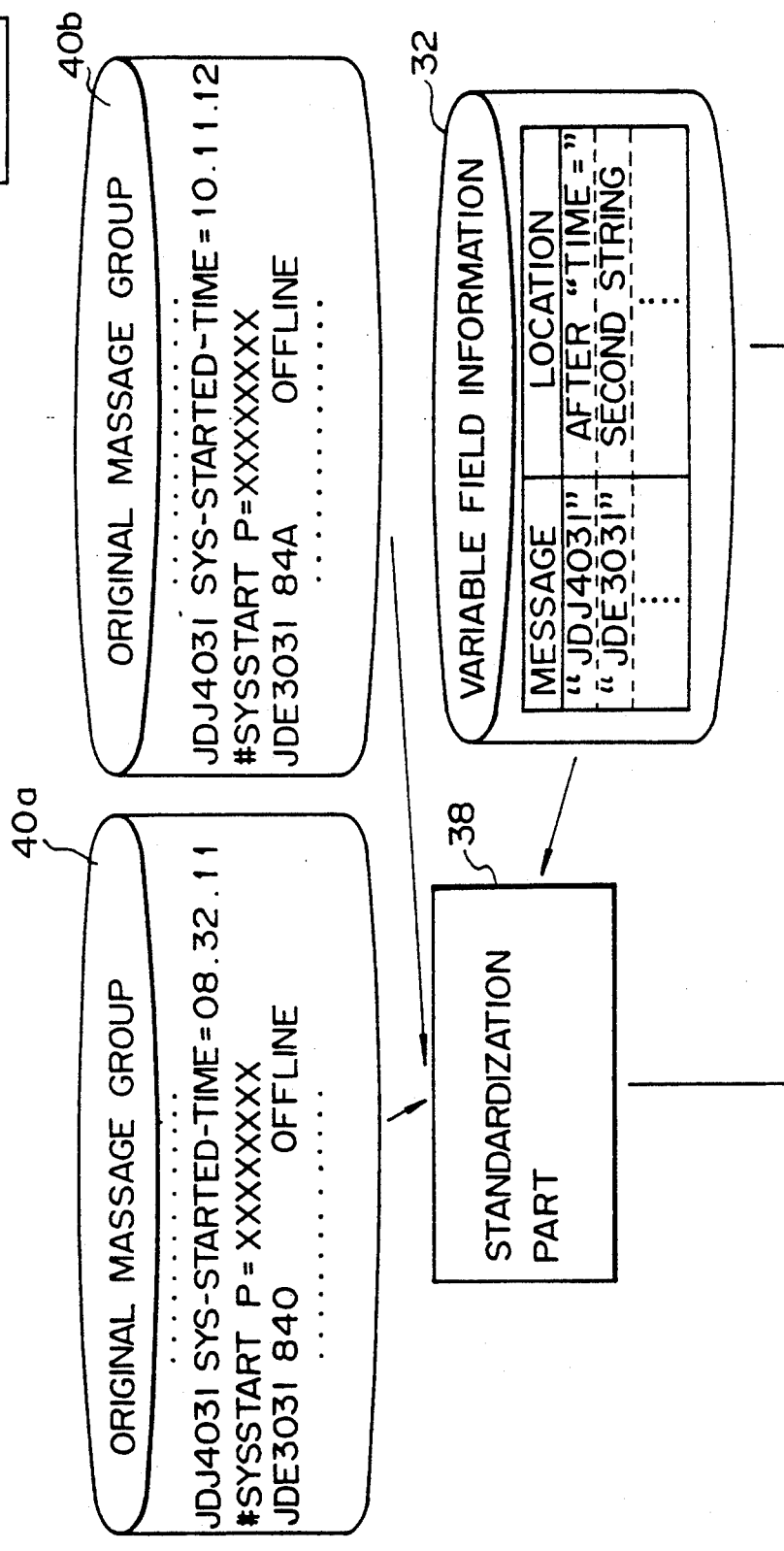

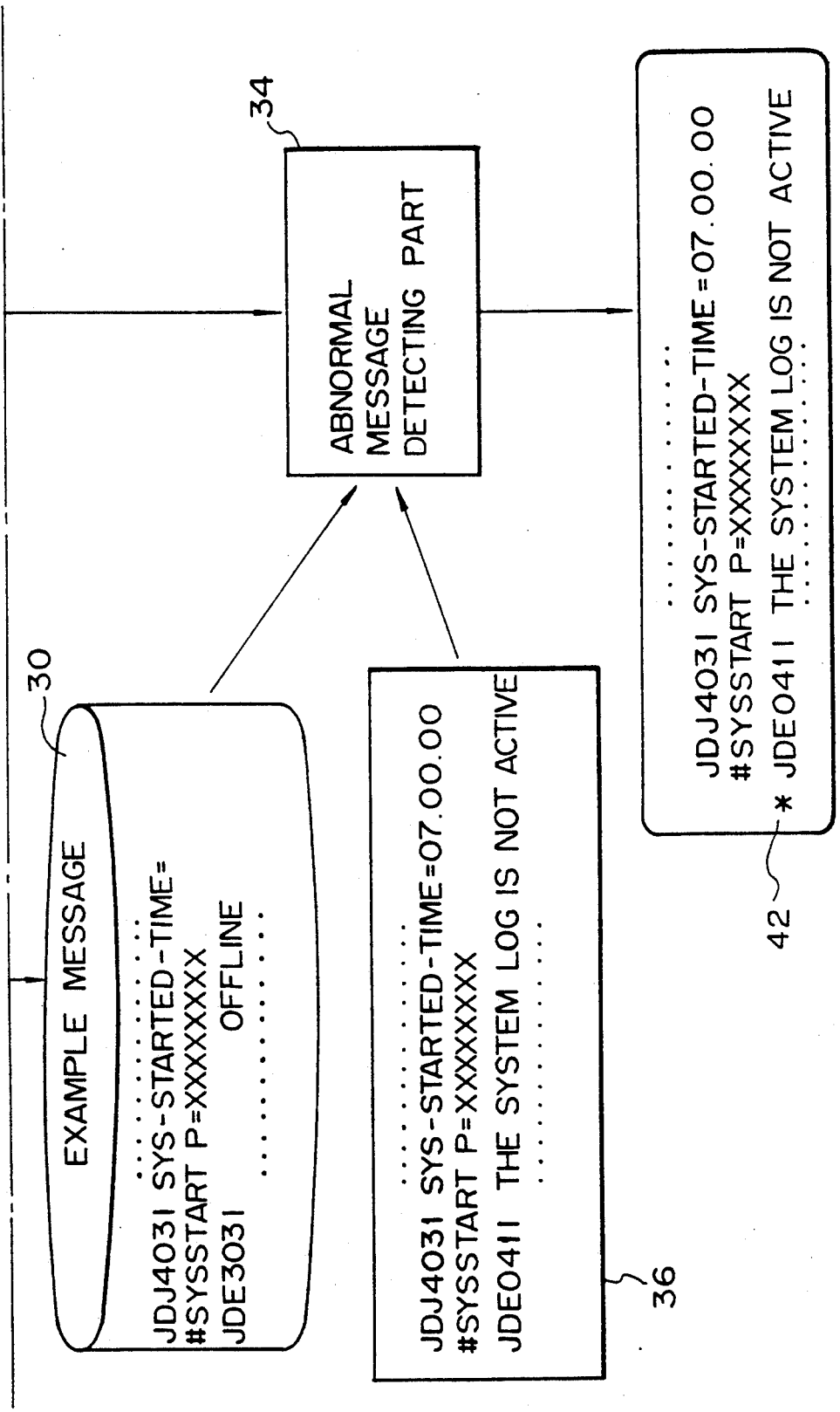

METHOD OF DETECTING AND PROCESSING ABNORMAL MESSAGE OUTPUT FROM COMPUTER SYSTEM AND DETECTING AND PROCESSING APPARATUS THEREFOR

BACKGROUND OF THE INVENTION

1. Field of the Invention

The present invention relates to a method of automatically detecting and processing abnormal messages from among system messages output from a computer system, and a detecting and processing apparatus for realizing this method.

2. Description of the Related Art

To recognize an operation state of a computer system, an operator observes system messages displayed on a main console, etc. of the computer system.

For example, during an initial program loading (IPL) operation after power is first supplied to the computer system, system messages showing the results of successive initializing steps are displayed on the main console, and the operator confirms a normal progress of the operation by observing the system messages, and must recognize an abnormal state when messages showing an abnormal state are displayed, to take the action necessary for coping with the abnormal states.

In larger scale computer systems, however, since the number of messages for an operation becomes large, and in general, the messages showing the abnormal states rarely appear among a series of messages, observing the console to find an abnormal message is tedious, and further, it is easy for an abnormal message to pass unobserved.

SUMMARY OF THE INVENTION

Therefore, an object of the present invention is to provide a method of automatically detecting and processing abnormal messages and a detecting and processing apparatus for realizing this method, to thereby facilitate the observation of abnormal messages by an operator and to reduce the load on the operator.

Thus, in accordance with the present invention, there is provided a method of detecting and processing abnormal messages from among messages output from a computer system, comprising the steps of:

(i) storing example messages of normal messages output during a normal operation of the computer system, into a first storage;

(ii) storing information of a location of variable portions in the normal messages, into a second storage;

(iii) comparing an object message with the example messages, stored in the first storage except for the variable portions in the object message and the example messages determined by the information stored in the second storage;

(iv) determining that the object message is an abnormal message if none of the example messages coincide with the object message in the step (iii); and (v) outputting the object message so that the abnormal message is distinguishable from normal messages.

Preferably, the method further comprises the steps of:

gathering normal message groups output during normal operations of the computer system, which outputs different normal message groups in different operation; and comparing a normal message with another message among the gathered normal message groups, except for the variable portions in the normal messages determined by the information stored in the second storage, and in step (i), the normal messages among the normal message groups are successively stored as the example messages to the first storage, except for messages which coincide with a message already stored in the first storage, in the comparing step.

In accordance with the present invention, there is also provided an apparatus for detecting and processing abnormal messages from among messages output from a computer system, comprising first storage device for storing example messages of normal messages output during a normal operation of the computer system, a second storage device for storing information of a location of variable portions the normal messages, and an abnormal message detecting device for comparing an object message with the example messages stored in the first storage device, except for the variable portions in the object message and the example messages determined by the information stored in the second storage device, to thereby determine that the object message is an abnormal message if none of the example messages coincide with the object message in the comparison, and for outputting the object message so that the abnormal message is distinguishable from normal messages.

Preferably, the apparatus further comprises a third storage device for storing normal message groups output in normal operations of the computer system, which outputs different normal message sounds during different operations, and a standardization device for comparing a normal message groups stored in the third storage device, except for the variable portions in the normal messages determined by the information stored in the second storage device, and for successively storing the normal device, except for messages which coincide with a message already stored in the first storage device in the comparison.

BRIEF DESCRIPTION OF THE DRAWINGS

FIG. 1 is a block diagram showing an example of a computer system to which the present invention is applied, FIG. 2 is a schematic block diagram of an abnormal message detecting and processing apparatus according to an embodiment of the present invention;

FIGS. 3A and 3B are an illustrative diagram showing an example of an operation of the apparatus shown in FIG. 2.

DESCRIPTION OF THE PREFERRED EMBODIMENTS

Figure 4A:
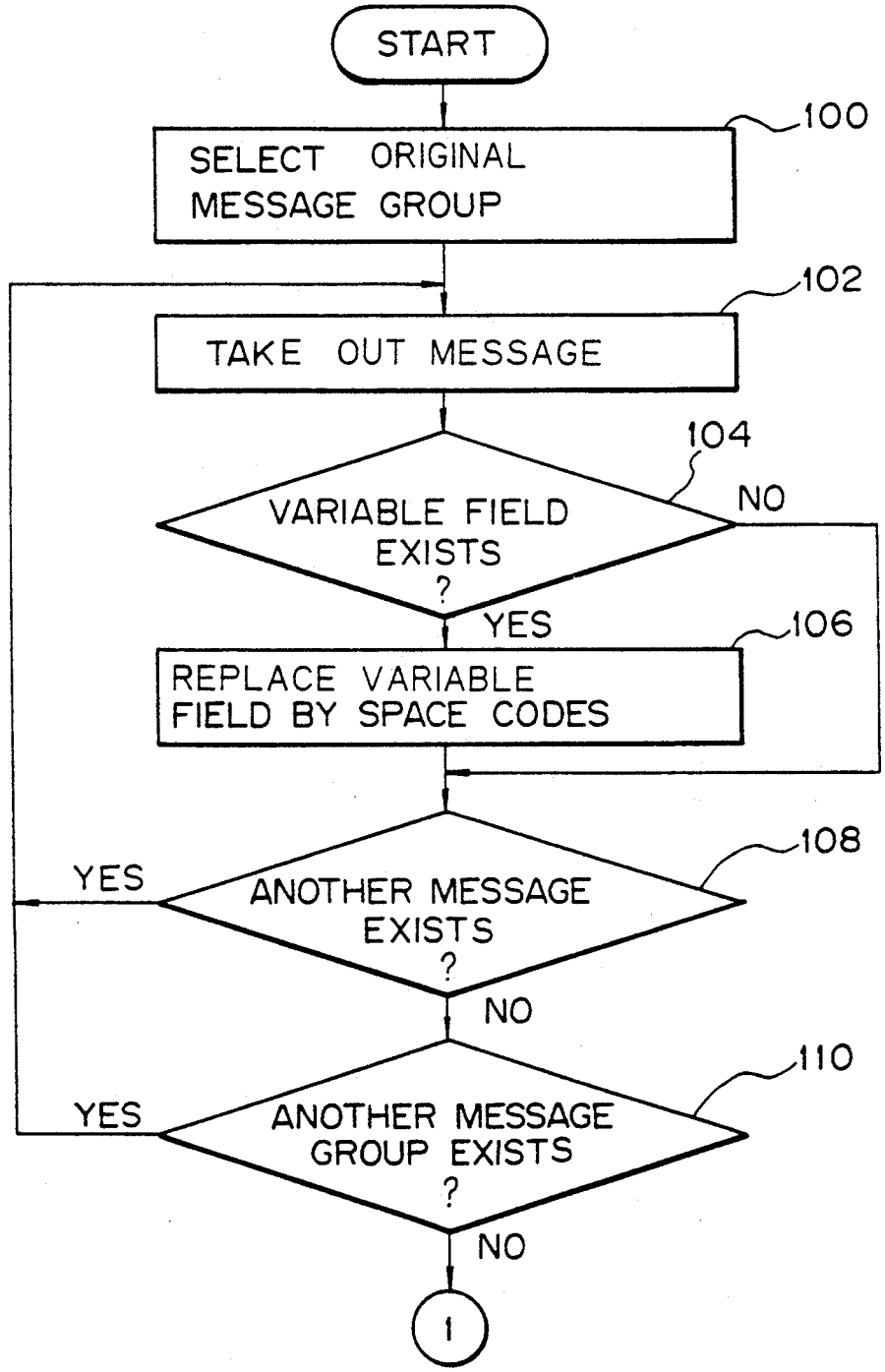
FIGS. 4A and 4B are a flowchart showing a process of a standardization of original messages when making example messages.

FIG. 1 shows an example of a computer system. This system comprises a main computer 10, a main console 12, and various peripheral devices, such as time sharing system (TSS) terminals 14, printers 16, and magnetic tape memories (MT's) 18.

After power is first supplied to the computer system, system messages 20 showing results of the initializing steps, such as an activation of system software for handling the peripheral devices, are displayed on the main console 12.

FIG. 2 is a block diagram showing a schematic construction of an apparatus for detecting and processing abnormal messages included in the system messages 20, according to an embodiment of the present invention.

The apparatus comprises an example message storing part 30, a variable field information storing part 32, and an abnormal message detecting part 34. The example message storing part 30 stores given examples of normal messages in the form of character strings, and the variable field information storing part 32 stores information of location of variable fields in the character strings of the example messages. The abnormal message detecting part 34 compares input messages stored in an input message storing part 36 with the example messages, except for variable portions determined by the information stored in the variable field information storing part 32, to determine whether an example message which coincides with the input message exists in the example message storing part 30, and outputs the results of the determination.

Preferably, the apparatus further comprises a standardization part 38. The standardization part 38 compares given groups of normal messages stored in an original message storing part 40 with another original message, except for variable portions determined by the information stored in the variable field information storing part 32, and successively stores the normal messages into the example message storing part 30 as the example messages except for messages which coincide with a message already stored in the example message storing part 30.

First, an operation of the apparatus comprising the example message storing part 30, the variable field information storing part 32, and the abnormal message detecting part 34 is explained.

A group of normal messages which must be output in an operation, such as an IPL operation, of a normally operating computer system is prepared and stored in the example message storing part 30, and information of a location of variable fields of the messages is prepared and stored in the variable field information storing part 32. The variable fields may include variable data, such as day and time, which vary at each output.

In operation, the abnormal message detecting part 34 compares each message generated in an operation of the computer system and stored in the input message storing part 36 with the example messages, except for variable portions specified by the information stored in the variable field information storing part 32, and determines that the message is normal if the same message exists in the example message storing part 30, and that the message is abnormal if the same message does not exist in the example message storing part 30. The messages determined as abnormal messages are displayed on the main console 12 (FIG. 1) so as to be distinguished from other normal messages. For example, the abnormal messages are displayed with specific characters, or displayed in colors different from those of other normal messages, or at a different level of brightness, and thus the operator can easily recognize the abnormal messages.

In an computer system where the required work is not changed every day, the system messages output in an operation, such as an IPL operation, also are not changed, except for the variable field. Therefore, a group of normal messages output during the operation of a normally operating computer system can be used as the example messages.

On the other hand, in an computer system where the required work is changed, for example, each day of the week, the system messages output, for example, in an IPL operation, also are changed according to the work. In this case, groups of normal messages gathered during operations which output different system messages, also may be used as the example messages stored in the example message storing unit 30.

In such a case, however, since the message groups usually have common messages having the same pattern as that of another message group, the common messages would be duplicated if all message groups were adopted as the example messages, and therefore, the example messages stored in the example message storing part 30 would become redundant, and the efficiency of the processing in the abnormal message detecting part 34 would be lowered.

The redundancy of the example message can be advantageously removed in the apparatus further comprising the standardization part 38.

FIGS. 3A and 3B are an illustrative diagram showing an example of the operation of the apparatus comprising the standardization part 38.

Two groups of original messages 40a and 40b obtained during two different normal operations are given in FIG. 3A. The information of a location of variable fields of the messages is stored with the top character strings to distinguish the messages from others in the variable field information storing part 32, as shown in FIG. 3A.

The standardization part 38 determines that two messages are the same, if a message included in the original message group 40a coincides with a message included in the original message group 40b, except for the variable field determined by the information stored in the variable field information storing part 32, adopts one of two messages as the example message, and stores the message in the example message storing part 30, and thus example messages which are not duplicated are stored in the example message storing part 30, as shown in FIG. 3B.

The abnormal message detecting part 34 evaluates the input messages 36 by referring to the contents of the example message storing part 30 and the variable field information storing part 32. If an example message coinciding with an input message exists, the input message is evaluated as a normal message, and if no example message coinciding with an input message exists, the input message is evaluated as an abnormal message. A specific character 42, for example, "*" is attached to the abnormal message, and is displayed on a main console, as shown in FIG. 3B.

Figure 4B:
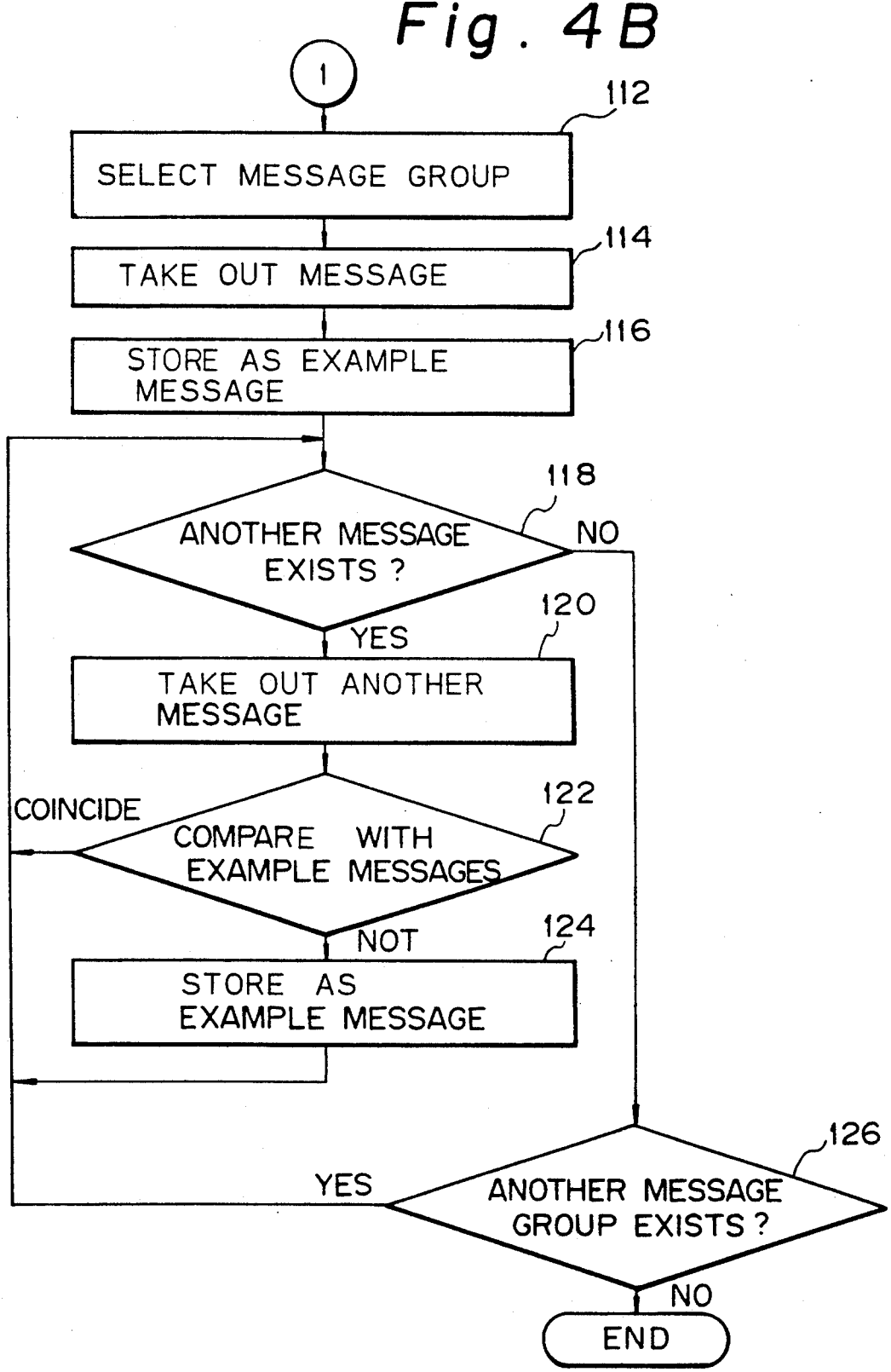

The standardization part 38 and the abnormal message detecting part 34 are realized by software programs executed by the main computer 10 (FIG. 1). FIGS. 4A and 4B are a flowchart showing a process for realizing the standardization part 38.

One of the original message groups is selected as a processing object in step 100, and in step 102, one of messages is taken out from the original message group. In step 104, the content of the variable field information storing part 32 is searched to find a same character string as the top character string of the message, to thereby determine whether the message has any variable fields. If the message has a variable field, in step 106 characters in the variable field are replaced by space codes, or the characters in the variable field are deleted. Thereafter, if another message remains in step 108, steps 102 to 106 are repeated until no message exists in the selected original message group. After the treatment of all of the messages in the selected group is completed, in step 110, it is determined whether another message group exists. If an untreated message exists, steps 102 to 108 are repeated until all of the message groups have been treated.

After any replacement or deletion necessary for all of the original message groups is completed, in step 112, one of the treated message groups is selected, and in step 114, one of messages in the selected group is taken out and stored in the example message storing part 30 in step 116. Then, in step 118, it is examined whether another message exists in the selected group, and steps 120 to 124 are repeated for all of the remaining message in the selected group. In step 120, another message is taken out, and in step 122, the message is compared with all of the example messages stored in the example message storing part 30. If an example message coincides with the message, the process returns to the step 118 without storing the message, and if no example message coincides with the message, the message is stored as an example message, to the example message storing part 30, and the process returns to the step 118. If no message exists in the group selected in step 118, in step 126 it is determined whether another message group exists. If another message group exists, one of the remaining message groups is selected and the process returns to step 118.

If no remaining message group exists in the step 126, the process is ended.

Figure 5:
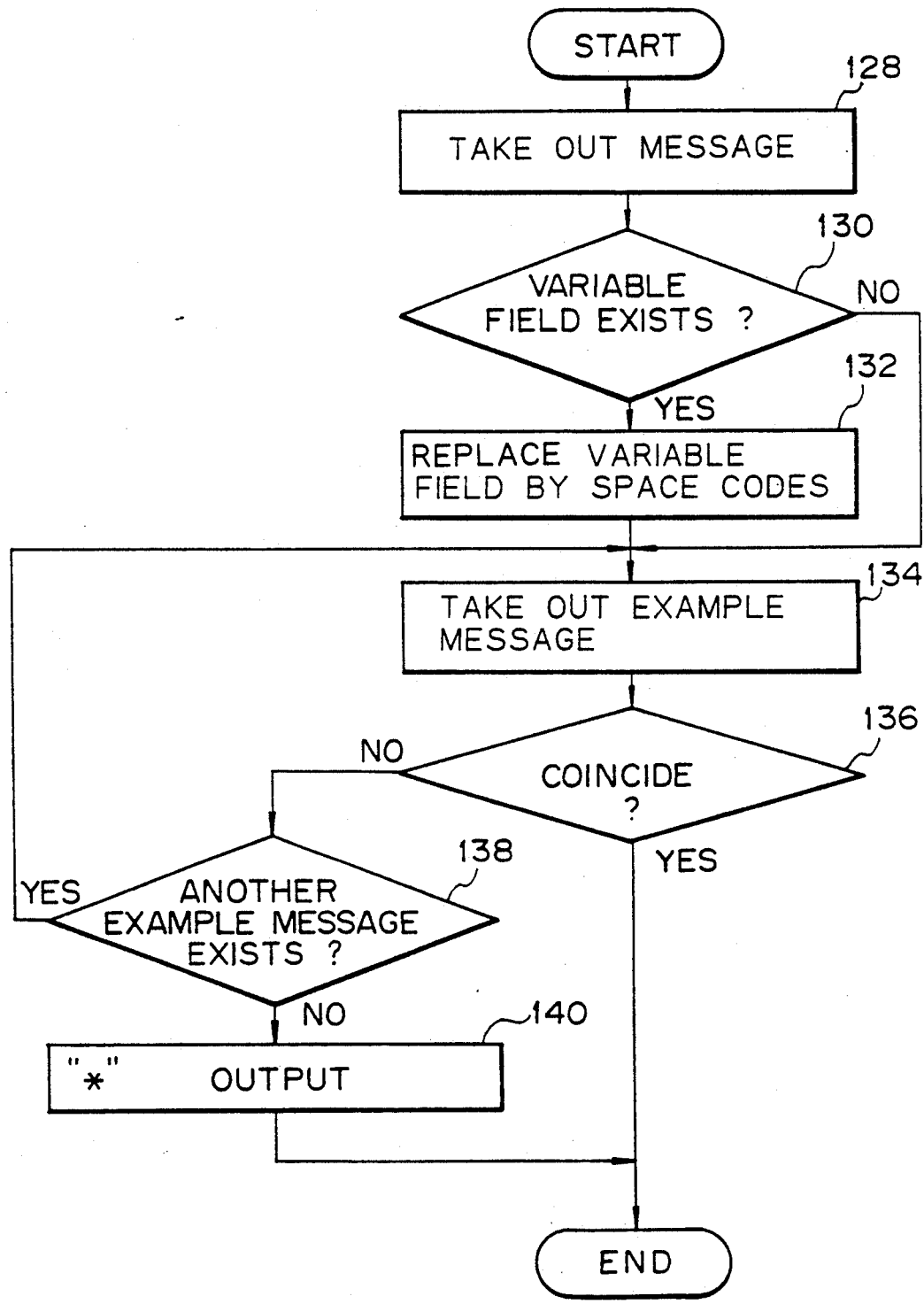
FIG. 5 is a flowchart showing a process of detecting and processing an abnormal message.

FIG. 5 is a flowchart showing a process for realizing the abnormal message detecting part 34 for an input message.

In step 128, the input message is taken out and it is determined whether the message has any variable fields by referring to the variable field information storing part 32 in step 130. If the message has the variable field, in step 132, characters in the variable field are replaced by space codes or deleted.

In step 134, an example message is taken out from the example message storing part 30, and in step 136, is compared with the treated input message. If the example message does not coincide with the treated input message, in step 138, it is determined whether another example message remains in the example message storing part 30. If any example messages remain, the process returns to step 134. If no example message remains in step 138, it is determined that the input message is an abnormal message, and in step 140, a character "*" is attached to the input message. In step 136, if an example message coinciding with the input message is found, it is determined that the input message is a normal message.

As mentioned above, in the abnormal message detecting and processing method and apparatus according to the present invention, since a determination of normal or abnormal is performed for each message, the method and apparatus has a greater flexibility than that wherein a group of messages is examined as a whole.

We claim:

1. A method of detecting and processing abnormal messages from among messages output from a computer system, comprising the steps of:
    (i) storing example messages of normal messages output during a normal operation of the computer system to a first storage;
    (ii) storing information of a location of variable portions in the normal messages to a second storage;
    (iii) comparing an object message with the example messages stored in the first storage except for the variable portions in the object message and example messages determined by the information stored in the second storage;
    (iv) determining that the object message is an abnormal message if none of the example messages coincide with the object message in step iii); and
    (v) outputting the object message so that the abnormal message is distinguishable from normal messages.

2. A method of detecting and processing abnormal messages as claimed in claim 1, wherein the object message is output with a specific character to distinguish an abnormal message from normal message, in step (v).

3. A method of detecting and processing abnormal messages as claimed in claim 1, wherein the abnormal message is output at a different brightness level or color from that of the normal message, in step (v).

4. A method of detecting and processing abnormal messages as claimed in claim 1, further comprising the steps of:
    gathering normal message groups output during normal operations of the computer system, which outputs different normal message groups during different operations; and
    comparing a normal message with another message among the gathered normal message groups, except for the variable portions in the normal messages determined by the information stored in the second storage, and
    in step (i), the normal messages among the normal message groups are successively stored as the example messages to the first storage, except for messages coinciding with a message stored in the first storage, in the comparing step.

5. A method of detecting and processing abnormal messages as claimed in claim 1, wherein the operation is an initial program loading operation.

6. An apparatus for detecting and processing abnormal messages from among messages output from a computer system, comprising:
    first storage means for storing example messages of normal messages output during a normal operation of the computer system;
    second storage means for storing information of a location of variable portions in the normal messages; and
    abnormal message detecting means for comparing an object message with the example messages stored in the first storage means, except for the variable portions in the object message and the example messages determined by the information stored in the second storage means, for determining that the object message is an abnormal message if none of said example messages coincide with the object message in the comparison, and for outputting the object message so that the abnormal message is distinguishable from normal messages.

7. An apparatus for detecting and processing abnormal message as claimed in claim 6, wherein the abnormal message detecting means output the object message with a specific character to distinguish the abnormal message from the normal messages.

8. An apparatus for detecting and processing abnormal messages as claimed in claim 6, wherein the abnormal message detecting means outputs, the abnormal message at a different level of brightness or color from that of the normal message.

9. An apparatus for detecting and processing abnormal messages as claimed in claim 6, further comprising:
third storage means for storing normal message groups output during normal operations of the computer system which outputs different normal message groups during different operations; and
standardization means for comparing a normal message with another message among the normal message groups stored in the third storage means, except for the variable portions in the normal messages determined by the information stored in the second storage means, and for successively storing the normal messages as the example messages to the first storage means except for messages coinciding with a message stored in the first storage means in the comparison.

10. An apparatus for detecting and processing abnormal messages as claimed in claim 6, wherein the operation is an initial program loading operation.

* * * * *